Figure 1:
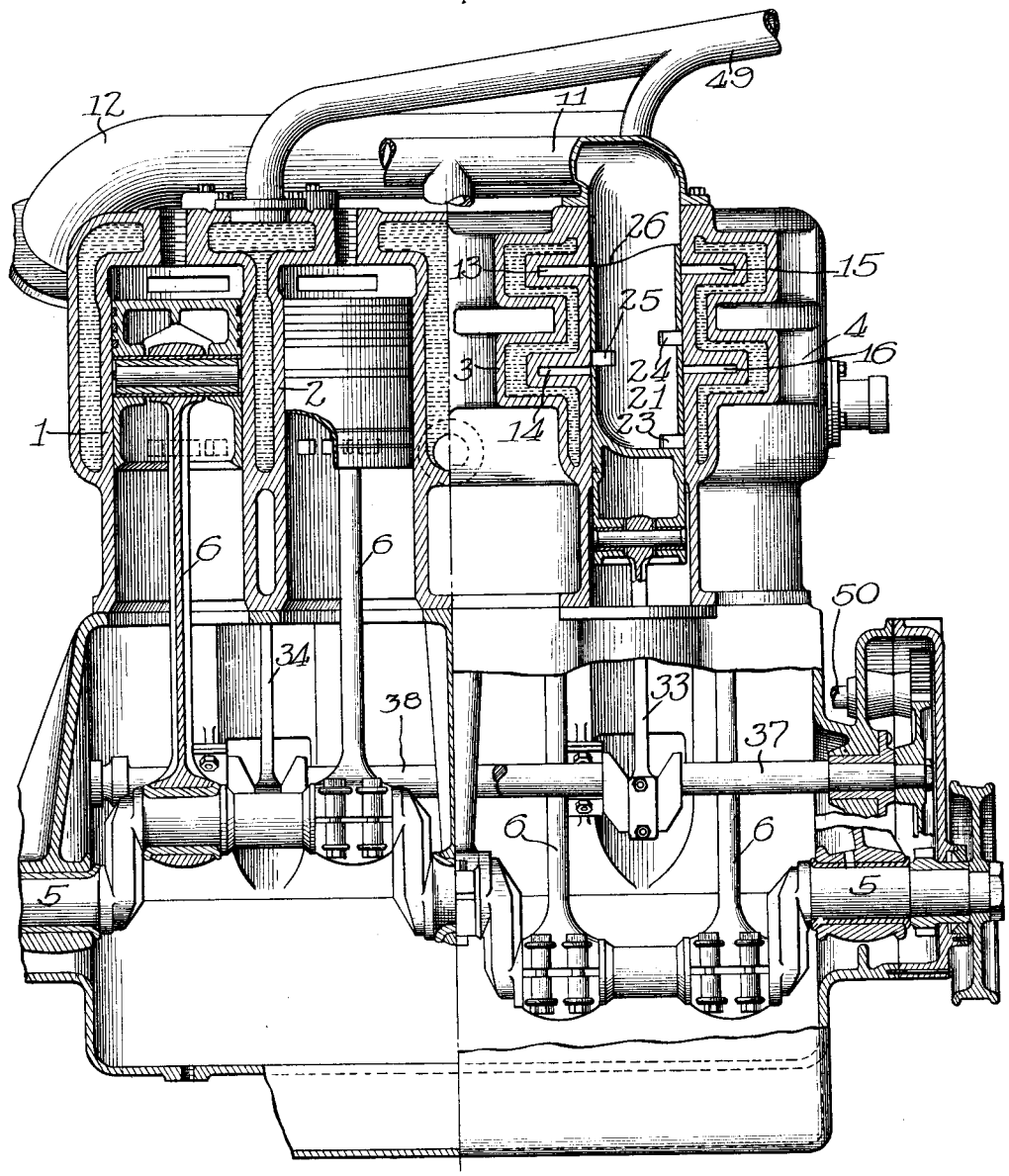

J. W. ROSS.
INTERNAL COMBUSTION ENGINE.
APPLICATION FILED MAR. 2, 1912.

1,163,691.

Patented Dec. 14, 1915.
5 SHEETS—SHEET 1.

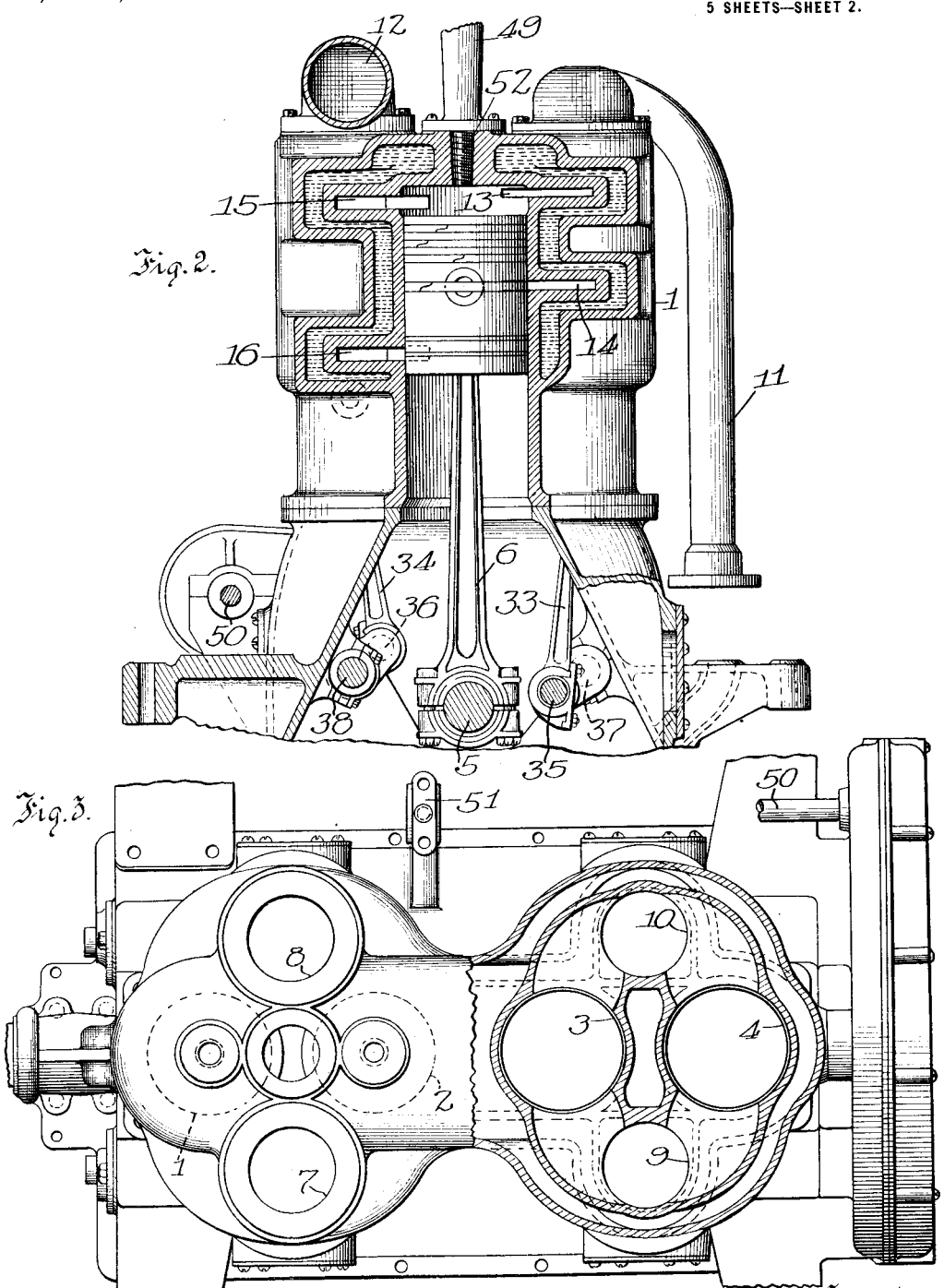

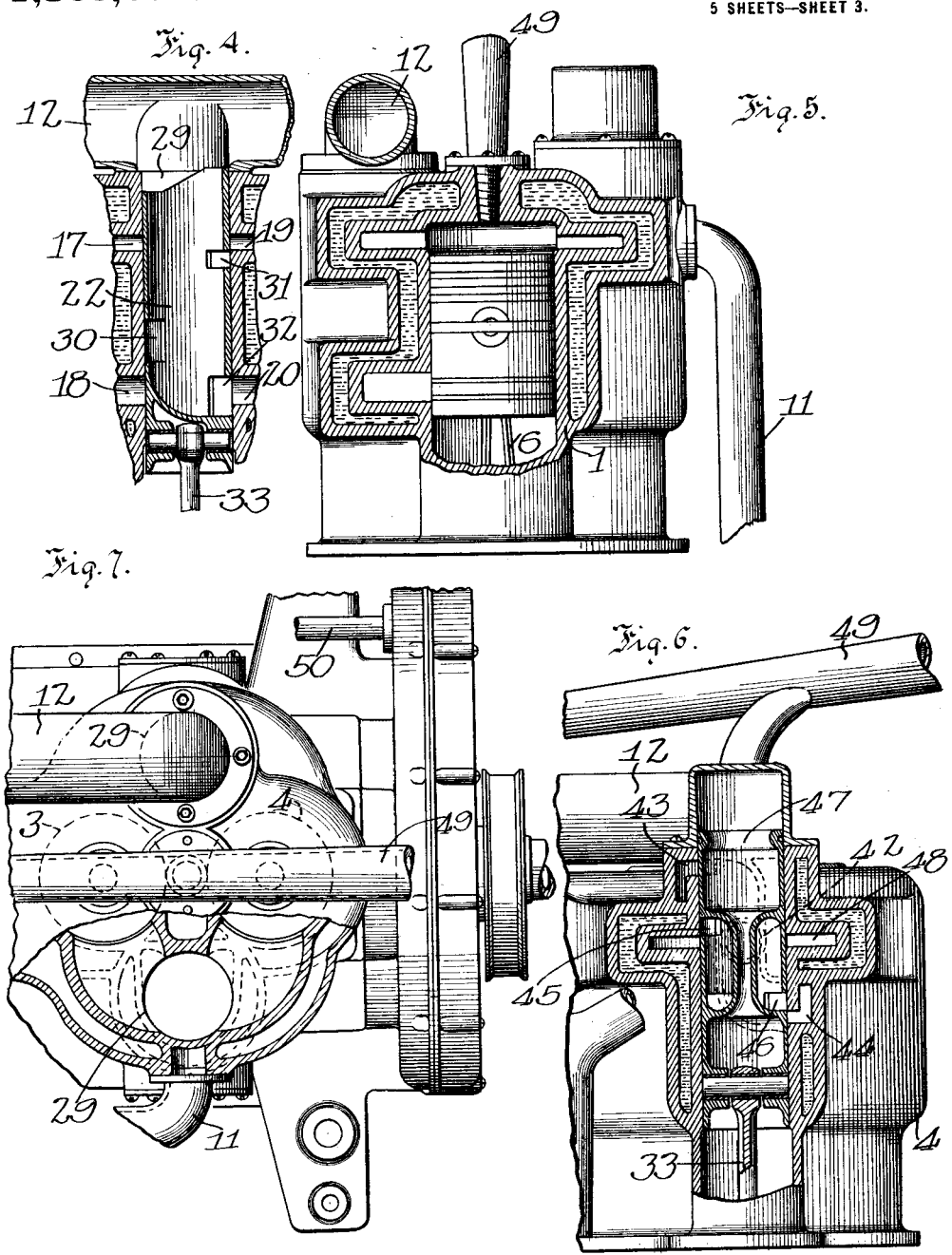
J. W. ROSS.
INTERNAL COMBUSTION ENGINE.
APPLICATION FILED MAR. 2, 1912.
1,163,691.
Patented Dec. 14, 1915.
5 SHEETS—SHEET 3.

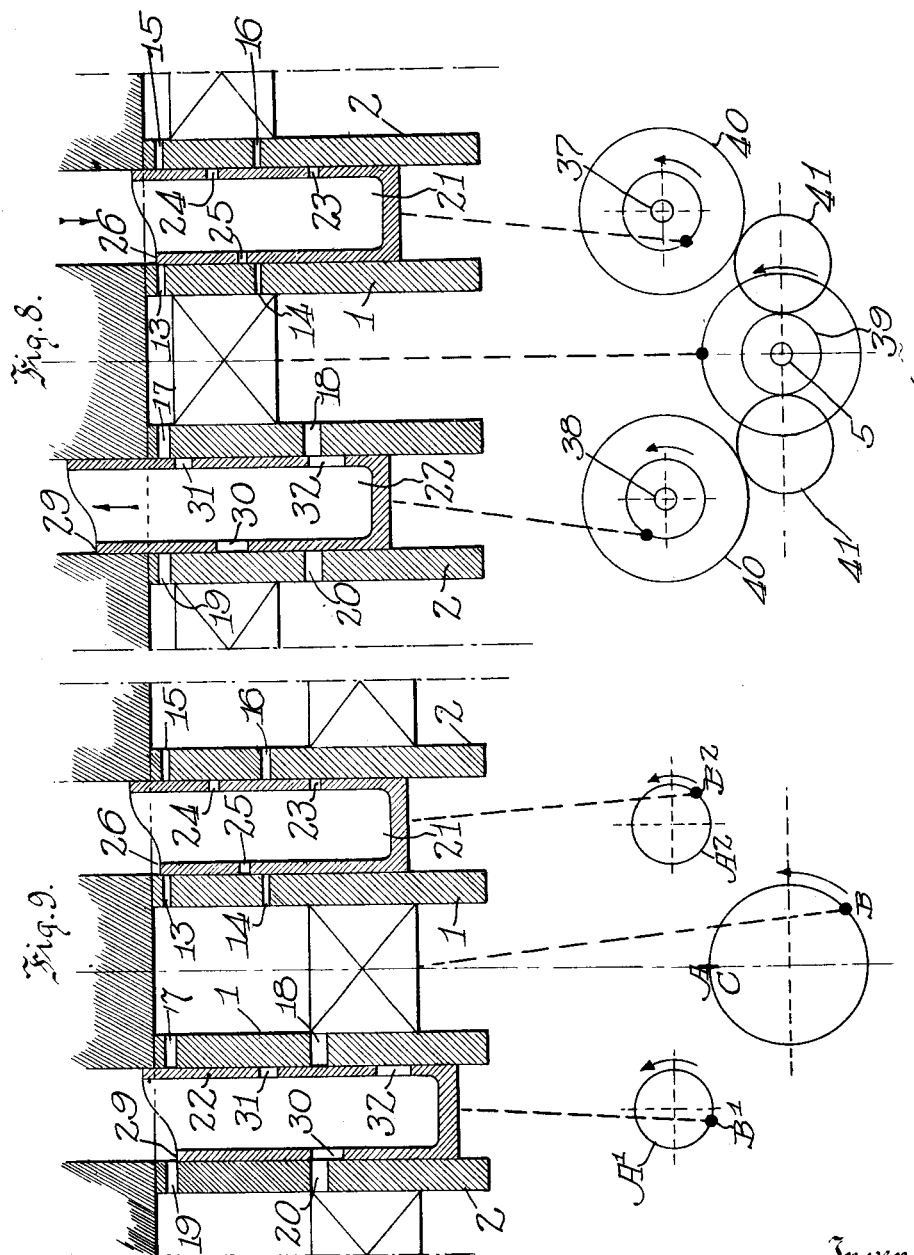

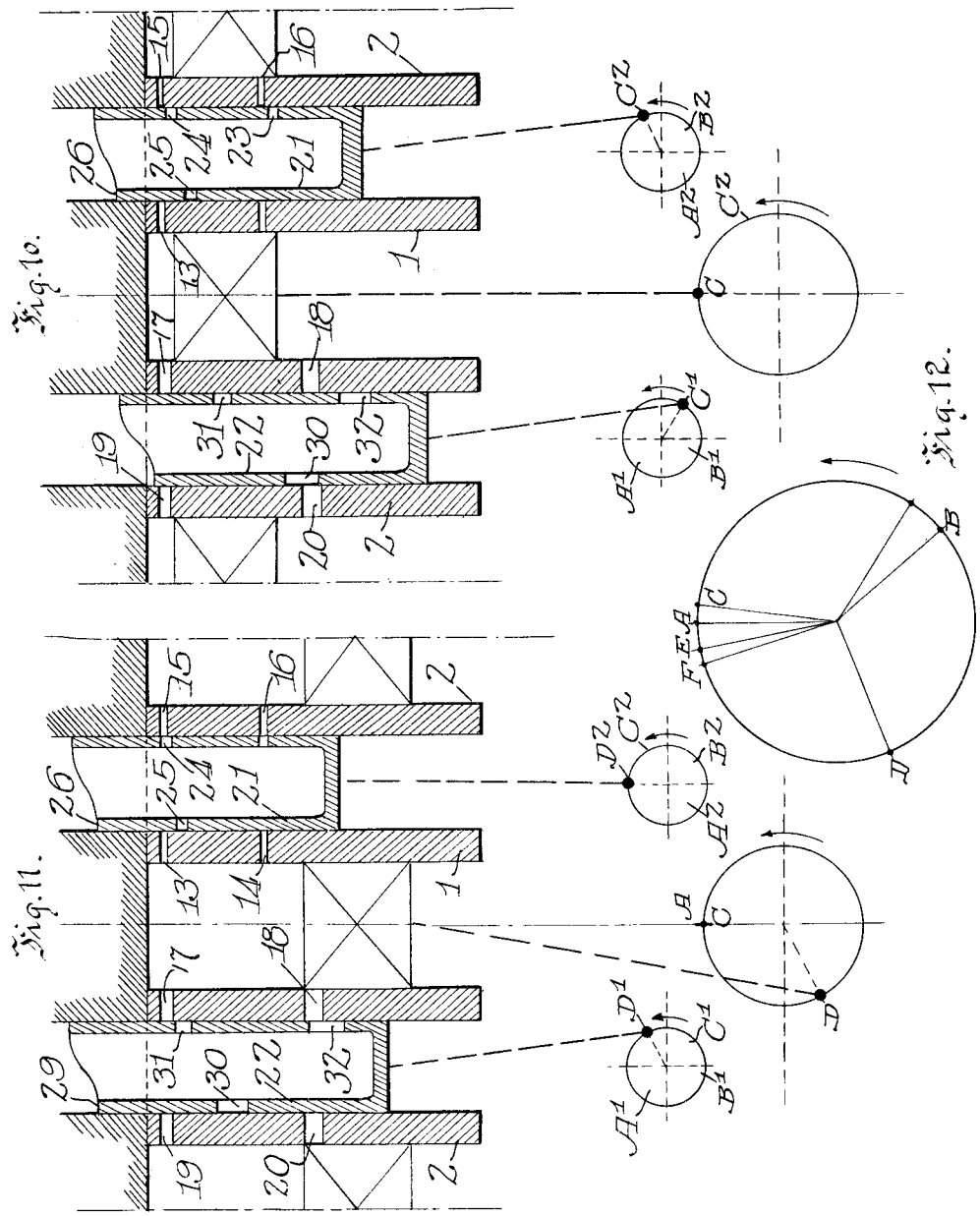

UNITED STATES PATENT OFFICE.

JOHN W. ROSS, OF CHICAGO, ILLINOIS.

INTERNAL-COMBUSTION ENGINE.

1,163,691.  Specification of Letters Patent.  Patented Dec. 14, 1915.

Application filed March 2, 1912. Serial No. 681,246.

*To all whom it may concern:*

Be it known that I, JOHN W. Ross, citizen of the United States, residing at Chicago, in the county of Cook and State of Illinois, have invented certain new and useful Improvements in Internal-Combustion Engines; and I do hereby declare the following to be a full, clear, and exact description of the invention, such as will enable others skilled in the art to which it appertains to make and use the same.

This invention relates to improvements in internal combustion engines, and has for its object to provide an engine of this character which is very simple in construction, durable and efficient, and has a minimum number of working parts subject to wear.

The invention consists in the features of construction and combinations of parts hereinafter fully described and particularly claimed.

In the accompanying drawings illustrating the invention: Figure —1— is a vertical longitudinal section of an engine constructed in accordance with my invention and showing at the left hand side two cylinders in central vertical longitudinal section and at the right hand side one of the valve casings and an intake valve therein in central vertical longitudinal section. Fig. —2— is a central vertical transverse section through one of the cylinders and showing certain parts of the operating mechanism. Fig. —3— is a view partly in plan and partly in horizontal section of the motor or engine. Fig. —4— is a fragmentary detail central vertical section of one of the exhaust valves and its casing. Fig. —5— is a fragmentary detail central vertical section through one of the cylinders showing a slightly modified form of construction. Fig. —6— is a central vertical section through the intake valve for the cylinder shown in Fig. —5— and which is also modified to accord with said modified form of construction of cylinder. Fig. —7— is a plan view partly in horizontal section of the modified form of construction illustrated in Figs. —5— and —6—. Figs. —8—, —9— —10—, and —11— are diagrammatic vertical transverse sections through a pair of cylinders and the intake and exhaust valve casings and valves therefor respectively, showing the valves and pistons in different positions to illustrate the cycle of operation thereof. Fig. —12— is a diagrammatic view showing the circle of travel of the wrist pins connected with the pitmen of the cylinders and indicating thereon the points of opening and closure of ports during each revolution.

The invention relates to that type of internal combustion engine known as the slide valve engine.

It has for its particular object to provide a multiple cylinder engine of this type in which the cylinders are arranged in sets, and each is fed by one intake valve and exhausted through one exhaust valve.

It has for its further object to provide an engine of this type in which the valves move slowly in comparison with the speed of travel of the pistons and at the time of intake or exhaust of any cylinder or cylinders of a set move most slowly so as to maintain the active ports open during the entire stroke of the piston for intake or exhaust of a charge.

A still further object of the invention is to provide gearing between the valves or valve actuating means and the crank shaft of the engine which is extremely simple and durable and requires no unusual skill or knowledge for effecting proper adjustment.

The invention resides particularly in the details of construction and relative arrangement of parts whereby the number of working parts is reduced to a minimum and consequently greater strength and durability and less wear and tear on the engine are assured.

In the drawings I have illustrated a four cylinder internal combustion engine of the four cycle type, this being a convenient form to fully illustrate the invention, though it will be understood that the latter may be applied with equal facility and advantage to internal combustion engines having a greater or less number of cylinders.

In the instance illustrated the cylinders are arranged in pairs, those indicated at 1 and 2 having their pistons connected with a single wrist pin of the crank shaft and the cylinders 3 and 4 having their pistons connected with another wrist pin of the crank shaft.

All of the pistons of the cylinders are of the well-known trunk type, and are connected with the crank shaft 5 by means of the pitmen 6 in the usual manner. Associated with each pair of cylinders 1 and 2, and, 3 and 4, respectively, is an intake valve casing and an exhaust valve casing, the intake valve casing associated with the cylinders 1 and 2 being indicated at 7, and the exhaust valve casing associated with said cylinders 1 and 2 being indicated at 8, while those associated with the cylinders 3 and 4 are indicated at 9 and 10, respectively. In each of the said valve casings 7 to 10 inclusive, which are most conveniently and preferably cylindrical, there is mounted a reciprocatory valve, which will be hereinafter described in detail. Connected with the respective intake valve casings 7 and 9 is a supply pipe 11, usually termed a manifold, which is connected with the carbureter or other source of supply of a combustible gas. Connected with the exhaust casings 8 and 10 is an exhaust pipe 12. The said intake and exhaust pipes 11 and 12 communicate with the upper ends of said respective valve casings.

Each of the intake valve casings is provided between its ends, but on opposite sides, with two ports 13 and 14 connecting the same with the cylinder 1 between the ends of the latter, and with two ports 15 and 16 communicating with the cylinder 2 between its ends. As the valves and casings associated with the cylinders 3 and 4 are merely duplicates of those associated with the cylinders 1 and 2, I have indicated the parts of the former by the same reference numerals or characters as those applied to the latter. Thus in viewing the intake valve casing shown in Fig. —1— and the valve and ports, etc., associate the same with cylinders 1 and 2 instead of cylinders 3 and 4. This avoids a great multiplicity of reference characters and renders the construction and operation more easily comprehensible.

Each of the exhaust valve casings is similarly connected with the respective pairs of cylinders by means of two ports between the ends thereof, as particularly shown in Fig. —4—, in which the ports 17 and 18 communicate with the cylinder 1 and the ports 19 and 20 with the cylinder 2. The intake ports 13 and 15 and the exhaust ports 17 and 19 are disposed at substantially the same level and communicate with the upper end portions of the cylinders 1 and 2 while the exhaust ports 18 and 20 are disposed so that their lower walls are substantially at the level of the lower limit of movement of the upper end of the pistons of said cylinders and the intake ports 14 and 16 are disposed at a level substantially midway between the levels of the respective exhaust ports 17 and 18.

In each of said respective valve casings 7 and 8, a trunk piston valve 21 and 22, respectively, is disposed, each of same being open at its upper end and closed at its lower end. The intake valve 21 is provided between its ends with three ports 23, 24 and 25. The upper end portion of said valve is cut away, as at 26, said cut away portion being substantially the same as a port, and being hereinafter referred to as such. The ports 23 and 24 are adapted to communicate with the ports 16 and 15 of cylinder 1 and the ports 25 and 26 are adapted to communicate with the ports 14 and 13 of cylinder 2. The said ports 23 and 24 are disposed at different levels than the ports 25 and 26 so that when one pair of said ports in the valve communicates with the respective ports of one cylinder, the other set of said ports of said valve will be out of register with the ports of the other cylinder so that only one set of said ports may be active at one time.

The exhaust valve 22 is provided with two ports 29 and 30 adapted to communicate with the ports 17 and 18 of cylinder 1 and is provided with ports 31 and 32 adapted to communicate with the ports 19 and 20 respectively, of cylinder 2, said port 29 being formed by cutting away the upper end portion of the valve 22 in the same manner as the port 26 is formed. The ports 30 and 32 are of greater length than the ports 29 and 31 and are similarly of greater length than the ports 18 and 20 for reasons which will be hereinafter more fully set forth.

Each of said trunk piston valves 21 and 22 is connected by means of its pitmen 33 and 34, respectively, with the cranks 35 and 36, respectively, of its actuating shafts 37 and 38, respectively, both said shafts being disposed parallel with the crank shaft 5 and geared thereto to rotate at one-half the speed thereof. The gearing employed may be of any suitable kind and arranged to rotate said shafts in any desired directions relatively to each other and to said crank shaft, as will be obvious. I have indicated gearing suitable for the purpose at the right hand side of Fig. —1—, said gearing including also means for actuating the water circulating pump for maintaining circulation through the water jackets of the cylinders and valve casings and the radiator, and for actuating a lubricating oil pump. The latter form no part of the present invention and full description and illustration of same is, therefore, omitted as being superfluous.

The operation of the engine and valves therefor will be more easily comprehended by reference to Figs. —8— to —11— inclusive, and in the following description these figures will be particularly referred to. In each of said figures there is shown the cylinder 1 and an intake and exhaust valve casing for the same on each side thereof, the intake side of cylinder 2 being shown to the right of the intake valve casing and the exhaust side of said cylinder to the left of the exhaust valve casing, this being essential to properly show the full cycle of operations. As the pistons of the cylinders 1 and 2 move in unison always in the same direction, I have merely indicated the positions of the pistons in the respective sides of cylinder 2. In Fig. —8— I have further indicated the gearing between the shaft 5 and the shafts 37 and 38 consisting of a spur gear 39 on shaft 5, a spur gear 40 on each of the shafts 37 and 38 which are double the pitch diameter of the gear 39 and idle gears 41 between the gear 39 and said gears 40. Thus all of said shafts rotate in the same direction.

Referring to Fig. —8—, piston of cylinder 1 is at the upper limit of its stroke having just completed its exhaust movement and being now prepared to draw in a new charge. The intake ports 13 and 14 are still out of register with the ports 26 and 25 of the intake valve 21 but, as shown below said intake valve, the crank of the shaft 37 connected therewith is approaching the lower limit of its movement and as soon as the piston of cylinder 1 begins its downward stroke the port 26 will register with the port 13 thus admitting gas. The port 14 is covered by the piston and as the latter moves downwardly the port 25 of the valve 21 registers therewith so that by the time the port 14 is uncovered by the piston it will register with said port 25 thus further admitting a charge therethrough. The exhaust valve at this time is so disposed that the port 32 registers with the port 18 which, however, is not exposed to the interior of the cylinder above the piston and consequently will neither admit nor exhaust gases therefrom. All of the other ports of the valve 22 are now out of register with the exhaust ports of either cylinder, as will be noted. The piston now moves from the point A through an arc greater than 180 degrees to the point B in the direction of the arrow of Fig. —9—, and has just passed the lower limit of its movement and started on its return stroke. It will now be noted that the intake ports of cylinder 1 and likewise of cylinder 2 are closed so that as the piston of cylinder 1 moves upwardly it will compress the charge which it has just drawn in. But while the piston of cylinder 1 was moving downwardly to take in a charge the piston of cylinder 2 was being forced downward by the ignition of the compressed charge in said cylinder. By again referring to Fig. —8— it will be noted that the valve 22 is now making its downward movement rapidly simultaneously with the downward movement of the piston of cylinder 2 so that by the time cylinder 2 reaches a point where it uncovers the port 20 the port 30 will, as shown in Fig. —9—, be in register with the port 20, and, therefore, the exploded charge will exhaust as soon as the upper end of the piston of cylinder 2 passes the upper wall of the port 20. As shown in Fig. —9— the piston of cylinder 2 is again moving upwardly and has again closed the port 20 but at this time the port 29 registers with the port 19 so that during the upward stroke of the piston of cylinder 2 burnt gases remaining in the latter will be forced out of the port 19. During the upward movement of the piston of cylinder 2 the crank actuating the valve 22 is passing from the point $B^1$ over the vertical diameter of the circle indicating the path of movement of the wrist pin of the crank of the shaft 38. At this time the movement of the valve 22 is obviously at its slowest so that the port 19 will remain open until the upper end of the piston of the cylinder 2 registers with the lower wall of said port and at this point the valve 22 closes said port. During the upward movement of the pistons of both cylinders for compressing the charge in cylinder 1 and exhausting the charge in cylinder 2 the crank actuating the valve 21 is passing from the point $A^2$ to the point $B^2$ and the crank actuating the valve 22 is passing from the point $B^1$ to the point $C^1$, as previously described.

About the time that the piston of cylinder 1 reaches the upper limit of its movement the charge therein is ignited and exploded and at the same time cylinder 2 is ready to take in a fresh charge. At this time the port 24 almost registers with the port 15 (Fig. —10—) and the valve 21 is still moving upwardly, and, at the time that the piston of cylinder 2 begins its downward stroke, said ports will register and thus a charge will be drawn into cylinder 2 in the same manner as previously described relatively to cylinder 1. At this time the valve 22 is moving upwardly to cause the port 32 therein to register with the port 18, such register being effected by the time the piston of cylinder 1 approaches the lower limit of its movement. The position of the valve 22 relative to the piston of cylinder 1 is shown in Fig. —11— and the valve 22 at this time is still moving upwardly so that as the piston moves upwardly from this point the port 31 of the valve 22 will register with the port 17 and remain in such register until the piston of cylinder 1 has again reached the upper limit of its movement, as shown in Fig. —8—.

Briefly reviewed, the cycle of operations may be read on Fig. —12— in which the point A on the circle indicates the position of the crank of the shaft 5 when the piston of cylinder 1 is at the upper limit of its movement. Point B indicates the position of the crank at the time that the intake valves of the cylinder A are closed and the latter is making its compression stroke, the point C indicates the return of the piston of cylinder 1 to the upper limit of its movement at which time the compressed charge is fired. The point D indicates that at which the exhaust port 18 is uncovered by the piston of the cylinder 1 after the charge has been ignited and the point E indicates when the exhaust is again closed. The point F indicates the opening of the intake valve for introducing a fresh charge whereupon the cycle is repeated as above described. Similarly in Figs. —10— and —11— indicating the circles through which the cranks of the respective shafts 37 and 38 travel, the points $A^1$, $B^1$, $C^1$ and $D^1$ indicate when the ports of the valve 22 register with the respective exhaust ports of the cylinders 1 and 2 and the points $A^2$, $B^2$, $C^2$ and $D^2$ indicate when the ports of the valve 21 register with the intake ports of said cylinders, that is to say, while the crank of the shaft 38 is moving from point $B^1$ to $C^1$ the exhaust ports of cylinder 2 are open and when moving from the points $D^1$ to the points $A^1$ the exhaust ports of cylinder 1 are open. In Fig. —11— while the crank is traveling through the arc $A^2 B^2$ the intake ports of cylinder 1 are open and while traveling through the arcs $C^2$, $D^2$ the intake ports of cylinder 2 are open.

It may be found more advisable to employ only one intake port for each cylinder and in Fig. —5— I have, therefore, illustrated a cylinder having a single intake port and in Fig. —6— a valve having only two instead of four intake ports. This valve is provided between its ends with an annular passage or chamber which is adapted to register with a passage 42 which is ogee-curved and communicates at its respective ends with the passages 43 and 44 which are adapted to register with the ports 45 and 46 respectively, of the valve 47, said ports 45 and 46 being so arranged that when the port 45 registers with the port 43 the port 46 registers with the intake port 48 leading to the cylinder 4 and vice versa. The manifold communicates with the passage 42 between the ends of the latter so that the charge has to travel the same distance from said inlet to either of the two cylinders supplied therefrom. The engine which I have herein illustrated is of the water cooled type and the water jackets are, therefore, shown together with the pipe 49 from which water passes out of the water jackets to the radiator, the water being maintained in circulation by means of a pump actuated by the shaft 50, said pump being adapted to be secured to the bracket 51 and its discharge end connected with the water jackets at a convenient point, said shaft 50 being also adapted to actuate a lubricating oil pump and a magneto, as will be obvious. At 52 in each of the cylinder heads I have indicated the spark plug or other charge-igniting means.

The invention may also be conveniently embodied in an engine of the air cooled type, as will be obvious.

The relative arrangement of cylinders and valves and the means for actuating the same are capable of being modified in many ways without departing from the invention or the specific cycles of operation. In the drawings I have shown the preferred form of embodiment only as being the most simple and efficient.

It will be noted that my said engine is entirely devoid of springs and cams or similar devices which are unreliable and subject to great wear and tear.

I claim as my invention:

1. In an internal combustion engine, the combination with a pair of cylinders, of two valve-casings fixedly supported relative to said cylinders, one thereof connected with a source of supply of a combustible fluid and the other thereof with an exhaust for products of combustion, and each connected by means of ports with both of said cylinders, a slide valve for each valve casing reciprocable therein and provided with ports corresponding in number with the ports establishing communication between its casing and the respective cylinders, said ports in said valves adapted to establish communication between the source of combustible fluid and said respective cylinders and between the latter and the exhaust being each offset relatively to each other, and gearing whereby said valves are reciprocated at less speed and less frequent intervals than the pistons of said cylinders.

2. In an internal combustion engine, the combination with cylinders arranged in pairs, and slide-valve casings corresponding in number with said cylinders and each communicating with both thereof, one of said casings communicating with a source of combustible fluid and the other with an exhaust, of a slide valve reciprocable in each casing for controlling the connection between said respective cylinders and said supply and exhaust and each adapted when at or near one limit of movement to establish communication between one cylinder and the supply or exhaust respectively and when at or near the other limit of movement to similarly connect the other cylinder therewith, and gearing for causing said valves to reciprocate at less speed and less frequent intervals than the pistons of said cylinders, said gearing including means whereby said valves are caused to move most slowly as said pistons move most rapidly and vice versa.

3. In multi-cylinder internal combustion engines comprising one or more sets comprising a plurality of cylinders each, an intake, an exhaust, a single intake valve casing communicating with all cylinders of a set and fixed relatively thereto, a single exhaust valve casing communicating with all cylinders of a set and fixed relatively thereto, a reciprocatory valve for each casing, gearing between each of said valves and the engine shaft for maintaining said valves constantly in motion at a speed equal to the speed of the pistons of said cylinders divided by the number of cylinders of a set, there being at least one port in each valve for each cylinder of the set, said ports of said respective valves offset relatively to each other and adapted to establish communication between each cylinder and the intake and exhaust respectively at different points in the stroke of said valve.

4. In multi-cylinder internal combustion engines comprising one or more sets comprising a pair of cylinders each, an intake, an exhaust, a single intake valve casing communicating with all cylinders of a set, a single exhaust valve casing communicating with all cylinders of a set, a reciprocatory valve for each casing, gearing between each of said valves and the engine shaft for maintaining said valves constantly in motion at one-half the speed of the pistons of said cylinders, there being at least one port in each valve for each cylinder of the set, said ports offset relatively to each other and adapted to establish communication between each cylinder and the intake and exhaust respectively at different points in the stroke of said valve, said gearing arranged to cause the valves to move most slowly during the intervals of most rapid movement of the pistons and vice versa.

5. In multi-cylinder internal combustion engines comprising a plurality of pairs of cylinders, an intake, an exhaust, a single intake valve casing for each pair of cylinders, a single exhaust valve casing for each pair of cylinders, a reciprocatory valve for each casing, gearing between each of said valves and the engine shaft for maintaining said valves constantly in motion at one-half the speed of the pistons of said cylinders, there being at least one intake port in said intake valve for each cylinder of the set, said ports offset relatively to each other and adapted to establish communication between each cylinder and the intake at different points in the stroke of said valve.

6. In multi-cylinder internal combustion engines comprising one or more sets each comprising a pair of cylinders, an intake, an exhaust, a single intake valve casing communicating with all cylinders of a set, a single exhaust valve casing communicating with all cylinders of a set, a reciprocatory valve for each casing, gearing between each of said valves and the engine shaft for maintaining said valves constantly in motion at a speed equal to the speed of the pistons of said cylinders divided by the number of cylinders in the set, there being two exhaust ports for each cylinder one of which is partly controlled by the piston, and there being two exhaust ports for each cylinder in said exhaust valve.

7. In a multi-cylinder internal combustion engine, the combination with cylinders arranged in sets each comprising at least two cylinders, an intake valve casing common to all the cylinders of a set and fixed relatively thereto, an exhaust valve casing common to all the cylinders of a set and fixed relatively thereto, there being at least one intake and one exhaust port for each cylinder, connection between the intake valve-casing and a source of supply of combustible fluid, a slide valve for each casing reciprocable therein, gearing between said valves and the engine shaft for imparting a reciprocating movement to each thereof at a speed equal to the speed of movement of the pistons of the cylinders divided by the number of cylinders in the set, there being relatively offset ports in said respective valves adapted to register consecutively with the respective ports of the several cylinders at different points in the stroke of said valves.

8. In an internal combustion engine, a cylinder, an exhaust valve casing having two ports connecting the same with said cylinder, the piston of the latter partly controlling one of said ports, a slide valve in said casing, gearing between the same and the engine shaft for reciprocating said valve at one-half the piston speed, said valve provided with two ports, one thereof longer than the other and partly controlling said piston-controlled exhaust port and adapted to register therewith at each power stroke of the piston for partly exhausting the products of combustion from the cylinder at the end of said power stroke, and said other port adapted to register with the other exhaust port as said piston closes the former on its upward stroke for completing the exhaust of said products.

9. In a multi-cylinder internal combustion engine, an exhaust valve casing common to several cylinders and having two ports for each cylinder, the piston of each cylinder partly controlling one of said ports, a slide valve in said casing, gearing between the same and the engine shaft for reciprocating said valve at one-half the piston speed, said valve provided with two ports for each cylinder, one thereof longer than the other and partly controlling said piston-controlled exhaust ports of said respective cylinders and adapted to registed therewith at each power stroke of the piston for partly exhausting the products of combustion from the cylinder at the end of said power stroke, and said other port adapted to register with the other exhaust port as said piston closes the former on its upward stroke for completing the exhaust of said products.

10. In a multi-cylinder internal combustion engine, a pair of cylinders, a single slide-valve casing common to both thereof and fixed relatively thereto, and connected with a source of combustible fluid, at least one port of each cylinder connecting the same with said valve casing, a reciprocatory valve in said casing, gearing between the same and the engine shaft for reciprocating said valve at one-half the piston speed, at least one port in said valve for establishing communication between each of said cylinders and said source of fluid, said ports adapted to alternately register with the respective cylinder ports.

11. In a multi-cylinder internal combustion engine, a pair of cylinders, a single slide-valve casing common to both thereof and fixed relatively thereto, and connected with a source of combustible fluid, at least one port for each cylinder connecting the same with said valve casing, a reciprocatory valve in said casing, gearing between the same and the engine shaft for reciprocating said valve at one-half the piston speed, at least one port in said valve for establishing communication between each of said cylinders and said source of fluid, said ports adapted to alternately register with the respective cylinder ports, as said valve is disposed contiguous to its respective limits of movement.

12. In a multi-cylinder internal combustion engine, a pair of cylinders, a single slide-valve casing common to both thereof and fixed relatively thereto, and connected with a source of combustible fluid, at least one port for each cylinder connecting the same with said valve casing, a reciprocatory valve in said casing, gearing between the same and the engine shaft for reciprocating said valve at one-half the piston speed, at least one port in said valve for establishing communication between each of said cylinders and said source of fluid, said ports adapted to alternately register with the respective cylinder ports as said valve is disposed contiguous to its respective limits of movement, said gearing arranged to cause said valve to move most slowly as said pistons move most rapidly and vice versa.

13. In an internal combustion engine, the combination with a pair of cylinders, inlet and exhaust chambers, one adapted for connection with a source of supply of combustible fluid and the other with an exhaust for products of combustion, said chambers being connected by means of ports with both of said cylinders, ported valve members coöperating with said inlet and exhaust chambers to establish communication between the source of combustible fluid and the respective cylinders, and between the latter and the exhaust, pistons in said cylinders, a crank shaft for said pistons, and gearing for actuating said valve members from said crank shaft, said gearing including means for causing the valve members to operate at a less speed during the time when they establish communication between the inlet and the exhaust chambers and the cylinders than during the remainder of their movement.

14. In an internal combustion engine, the combination with a pair of cylinders, inlet and exhaust chambers, one connected with a source of supply of combustible fluid and the other with an exhaust for products of combustion, said inlet and exhaust chambers being connected by means of ports with both of said cylinders, ported valve members coöperating with said inlet and exhaust chambers to establish communication between the source of combustible fluid and said respective cylinders, and between the latter and the exhaust, pistons in said cylinders, a crank shaft for said pistons, and gearing for actuating said valve members at less speed and less frequent intervals than the pistons of said cylinders, said gearing including means whereby said valve members are caused to move most slowly as said pistons move most rapidly and vice versa.

In testimony whereof I have signed my name in presence of two subscribing witnesses.

JOHN W. ROSS.

Witnesses:
M. M. BOYLE,
RUDOLPH M. LOTZ.

Copies of this patent may be obtained for five cents each, by addressing the "Commissioner of Patents, Washington, D. C."